United States Patent [19]
Jacob

[11] Patent Number: 4,574,247
[45] Date of Patent: Mar. 4, 1986

[54] FM SIGNAL DEMODULATOR
[75] Inventor: Keith Jacob, Ann Arbor, Mich.
[73] Assignee: Multi-Elmac Company, Novi, Mich.
[21] Appl. No.: 612,394
[22] Filed: May 21, 1984
[51] Int. Cl.[4] .................................. A03D 3/04
[52] U.S. Cl. ............................... 329/126; 329/110; 329/122; 375/88
[58] Field of Search ............... 329/50, 105, 107, 110, 329/122, 126; 375/52, 80, 88, 94

[56] References Cited
U.S. PATENT DOCUMENTS
4,485,347 11/1984 Hirasawa et al. ................. 329/50

Primary Examiner—Eugene R. LaRoche
Assistant Examiner—James C. Lee
Attorney, Agent, or Firm—Krass & Young

[57] ABSTRACT

An FM demodulator wherein the input signal excursions advance a counter. At each of a sequence of equal sample times, the count is compared to a value which is the average of the highest and lowest counts during the sequence. The comparison may be numerically direct or by down-counting from a present number. The result of the comparison sets an output data value either "1" or "0".

6 Claims, 5 Drawing Figures

FM SIGNAL DEMODULATOR

DESCRIPTION

Introduction

This invention relates to FM signal demodulator circuits and more particularly to an FM demodulator of the frequency shift keying (FSK) type which is susceptible of all digital implementation.

BACKGROUND OF THE INVENTION

There are numerous commercial/industrial applications for radio-transmitter combinations wherein frequency modulation is used to convey data. For example, small battery operated FM transmitters and permanently installed receivers are used to control security systems, automatic gate openers, automatic garage door operators and the like. There has been a significant trend toward the miniaturization of the circuitry in such devices as well as a push for increased economy and reliability through the use of integrated circuit technology.

Prior art FSK demodulator circuits have been primarily, if not exclusively, analog devices and the components of such circuits do not lend themselves to integrated circuit technology and implementation. Other receiver portions such as a signal decoder, on the other hand, are easily implemented using digital and integrated circuit technology. Accordingly, one might find a commercial receiver having a hybrid combination of analog and digital devices. Cost cutting, improved reliability and reduced size are among the principal objectives which can be realized by eliminating this hybrid arrangement in favor of all integrated circuit implementation.

SUMMARY OF THE INVENTION

In accordance with a first aspect of the invention, an FM signal consisting of at least two distinct frequency components, f0 and f1, is demodulated using digital techniques to provide a data signal, typically binary or PDM, in which the occurrences of components in the original FM signal are represented by data values. In general this is accomplished by sampling the FM signal on a periodic basis and at a rate which is higher than the rate of occurrence of the components or the transition between the components, counting the number "n" of signal excursions which occur during the sample times, comparing the sample counts individually to a number N which is higher than the maximum number of f0 excursions which normally occur during a sample time but which are lower than the maximum number of f1 excursions which normally occur during a sample time, and thereafter generating an output having a first characteristic when n is less than N and the second characteristic when n is greater than N.

The functions just described can be advantageously carried out in a high noise environment or where the frequency stability of the components f0 and f1 is relatively poor by causing the number N to represent the average number of signal excursions occuring during a sample time. This is accomplished by counting the number of actual signal excursions which occur during some predetermined time period such as the full length of a data signal train and dividing this count by the number of sample times which occur over said period.

The function of the invention described immediately above can be implemented in several ways, all of which have the advantage of employing digital circuitry and therefore being susceptible of integrated circuit implementation. According to the simplest implementation, the input signal, reduced in frequency as necessary to a workable level, is applied to the input of the data counter which is reset by a clock at the sample rate. At the end of each sample the data count is input to a comparator which compares the data count "n" to a fixed value stored in a digital memory device and representing the number N previously described. The difference between the data count and the number N is applied to an output latch along with the clock signal which sets the sample times thereby to generate an output having one characteristic, for example a binary "0", when the data number is less than N, and another characteristic, such as a binary "1", when the data number is greater than N.

As hereinafter described still further implementations are possible including those in which the average number of sample time signal excursions is calculated and placed in storage and used for the comparison purpose. According to one such implementation, the result of the comparison between the average count and the actual count during each sample time is used to operate a signal generating output latch circuit as described above. In another implementation, the average number is placed in a down counter and the data signal count is then used to count the contents of the counter toward zero. If there is an overflow an output latch generates a binary "1" and if there is not overflow the output latch generates a binary "0". In both instances the output latch operates at the clock rate established by the sample rate generator.

The invention and the various aspects thereof can be best understood by reference to the following detailed description of the illustrative embodiments thereof. These should be taken with the accompanying drawing.

DETAILED DESCRIPTION OF THE PRIOR ART AND THE ILLUSTRATIVE EMBODIMENTS

Figure 1:
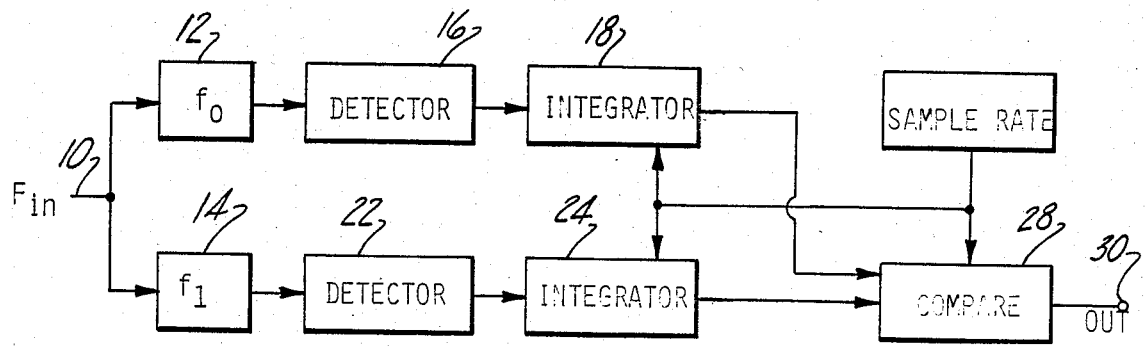
FIG. 1 is a showing of a typical prior art FM demodulator using analog devices.

Referring first to FIG. 1, a prior art analog FM demodulator is shown to comprise an input terminal 10 on which is received an FM signal (FSK) $F_{in}$ containing two discrete frequency components f0 and f1 the occurrences of which represent data. Terminal 10 is connected to parallel channels for frequency discrimination and demodulation purposes. The channel which is provided for detecting and processing the f0 signal comprises a filter 12 which is preferably tuned very sharply to pass the f0 signal. Filter 12 is connected to a detector 16 the output of which is proportional to noise plus signal level of f0. The output of detector 16 is connected to an integrator 18 which integrates the output of the detector over a sample time period to enhance the signal-to-noise ratio as will be apparent to those skilled in the art.

The f1 channel similarly comprises a sharply tuned filter 14, a detector 22, and an integrator 24. The output of the two integrators 18 and 24 are connected to opposite inputs of a comparator 28. The comparator generates a binary signal using, for example, either AM or PDM, at the sample clock time a low amplitude component of which represents receipt of the f0 and is generated when the output of integrator 24 is higher than that of 24. The output of the comparator 28 is high representing a "1" and receipt of the f1 component when the output of integrator 24 is greater than that of integrator 18. The integrators (18 and 24) are discharged to zero with the sample clock.

Figure 2:
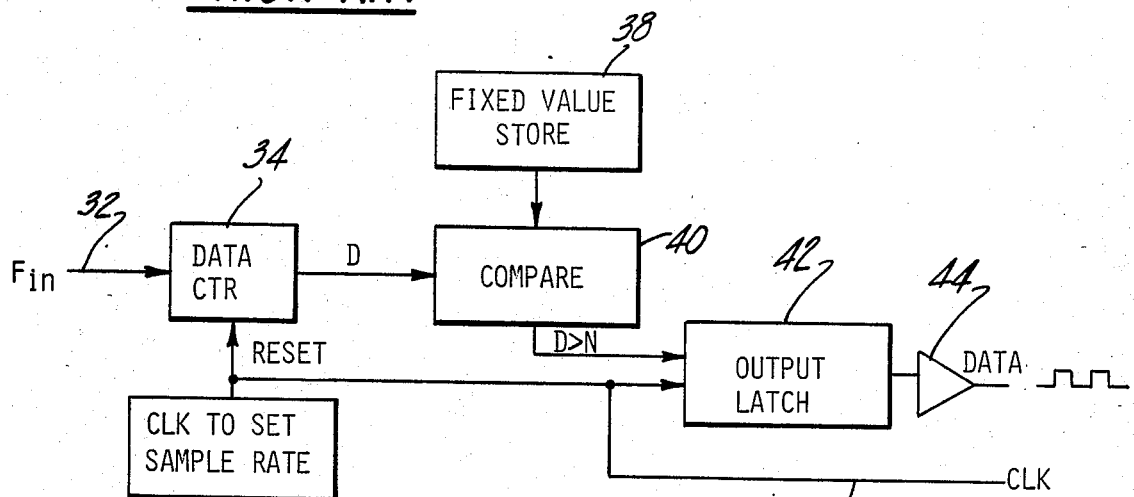
FIG. 2 is a block diagram of an illustrative embodiment of the present invention.

Referring now to FIG. 2, the block diagram of a digital circuit for performing the FM signal demodulation function but without the use of filters, integrators and other analog devices, is described. In FIG. 2 input line 32 receives an FM signal $F_{in}$ containing two distinct frequency components f0 and f1, the occurrences of which represent data in binary form. If the signal is received by wireless or radio broadcast at a very high frequency, it may be necessary or desirable to mix the received signal with a local oscillator to produce a lower frequency beat or difference signal for application to the digital circuitry hereinafter described.

The signal on line 32 is applied to a data counter 34 which can be a so-called ripple counter, a non-synchronous device, or it can be a synchronous counter. In any event, the count in the counter is maintained on a digital basis and advances one count for each excursion of the input signal on line 32. Counter 34 is connected to a clock 36 so as to be reset at a sample rate and at the end of the sample times established by the frequency of clock 36. This frequency is preferably chosen at twice the expected data rate, i.e., at twice the rate at which the frequency switches from f0 to f1 can occur in the input signal $F_{in}$.

A digital store 38 contains a fixed count value N which is higher than the maximum number of f0 excursions which normally occur during a sample time and which is lower than the maximum number of f1 excursions which can or which normally occur during a sample time. For example, if the normal or expected number of f0 excursions during a sample time period is 500 and the normal number of f1 excursions during a sample time is 550, N is preferably selected at 525, this number being selected to give the maximum frequency drift both up and down to the f0 and f1 components.

Outputs from data counter 34 and fixed value storage unit 38 are connected to a digital comparator 40 the data output of which is connected to one input of output latch 42. The other input of the latch 42 is connected to receive a clock signal from clock 36. When the data signal count D during a sample period is less than N the output latch 42 produces no output. However, when the data signal count D is greater than N the output latch 42 emits an output. Thus, a binary signal having only two values but containing the data content of the $F_{in}$ signal on line 32 is produced at the output of output latch 42. This may of course be amplified as necessary at 44 and supplied along with the clock signal on line 46 to a commercially useful device such as a radio security system operator/decoder.

Figure 3:
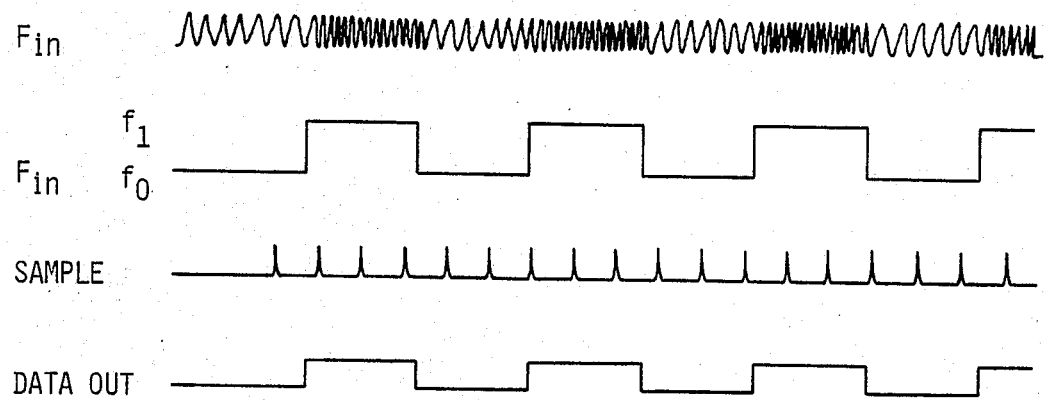
FIG. 3 is a wave-formed diagram useful in explaining operation of the devices of FIGS. 2, 4 and 5.

FIG. 3 illustrates the wave forms occuring in the circuit of FIG. 2. The first line represents the actual received signal $F_{in}$ and shows, with exaggeration, the frequency differences between the components f0 and f1. The second line of FIG. 3 is simply a binary or FSK representation of the time occurrence of the data representing frequency components f0 and f1 in the input signal. The third line represents the sample rate and as illustrated in FIG. 3, it is twice the maximum rate of occurrence of the data components. The last line represents the binary output of the output latch 42 wherein the low level signal represents a binary "0" and the high level signal represents binary "1". This is, of course, a pure AM signal, but the demodulation may just as easily result in a pulse duration modulated (PDM) signal as will be apparent to those skilled in the art. It is also obvious that the "1" and "0" values can be reversed.

Figure 4:
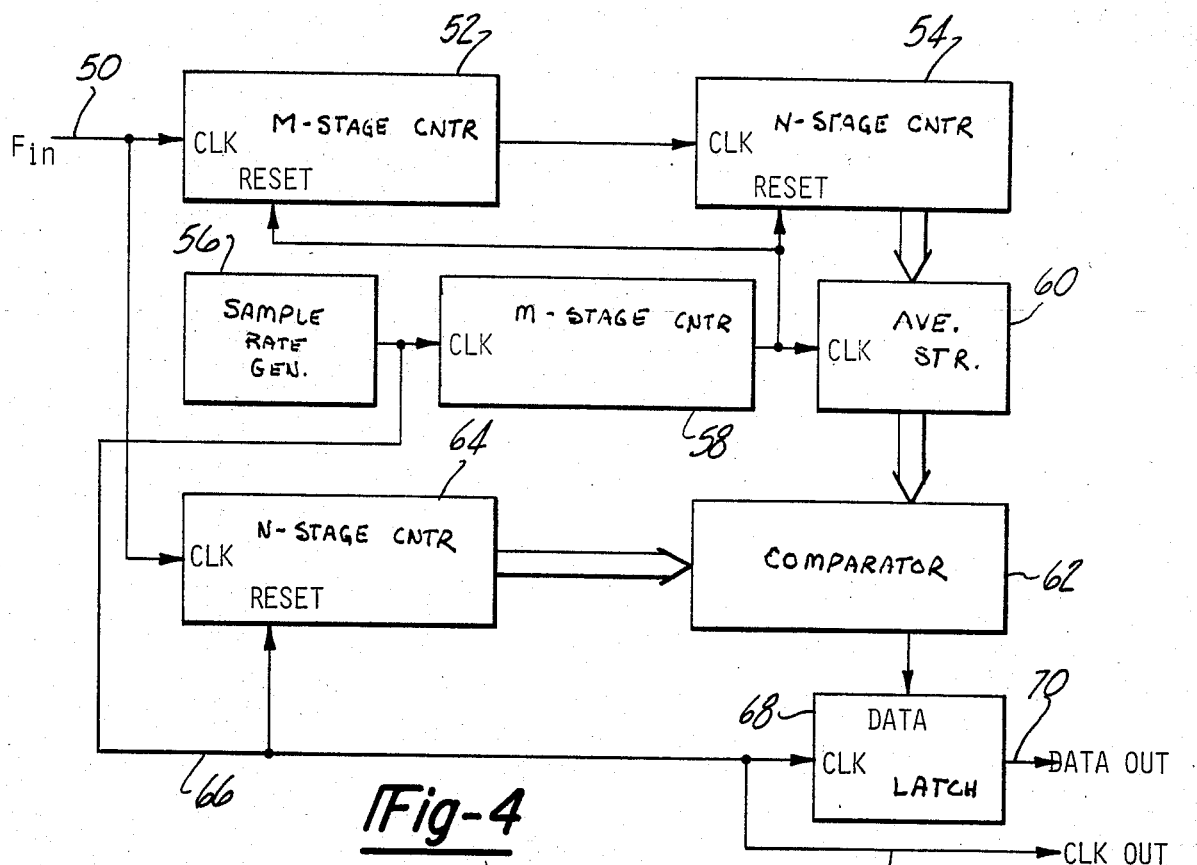
FIG. 4 is a block diagram of a second embodiment of the invention using the average value count for comparison purposes.

Referring now to FIG. 4, a second embodiment of the apparatus aspect of the invention is provided for calculating the number N as a function of the average number of input signal excursions occuring during a sample time, said number N being averaged over a relatively large number of sequential sample times. The system of FIG. 4 comprises an input signal line 50 on which the signal $F_{in}$ is received and applied to the input of an m-stage digital counter. The m-stage counter is preferably a non-synchronous ripple counter which responds to the positive excursions of the input signal $F_n$ but may be a synchronous counter. In any event, the last stage of counter 52 is connected to the first stage of an n-stage counter 54. As will be apparent to those skilled in the art, the counters 52 and 54 connected in series-cascade together represent a single counter but, as will hereinafter be described, the division of the physical counter structure into two parts is expeditious from the standpoint of deriving an average number N.

A sample rate generator 56 has the output thereof connected to the clock input of an m-stage counter 58 which is physically identical to the counter 52. The output of the counter 58 is connected to the reset input of both counter sections 52 and 54 and also to the clock input of an n-stage latch 60 which contains the number N representing the average number of signal excursions experienced during a sample time, such average number being calculated by determining the total number of input signal excursions which occur over a period representing a relatively large number of successive sample times and dividing that number by the number of sample times. In this case, the number of sample times is m and this is the number contained in the counter 58. The connection of the output of counter 58 to the reset inputs of both counters 52 and 54 represents the fact that the contents of counter 54 are transferred in parallel to the n-stage latch or storage device 60 at the completion of the period over which the average number N is to be calculated. The division of the total number contained in the combination of samples 52 and 54 is achieved by reason of the fact that only the contents of counter 54; i.e., the n most significant digits of the binary number representing the total count, are transferred to the latch 60.

The average number N from the latch 60 is transferred in parallel as a number to the subtractor comparator 62 where a straightforward binary subtraction takes place. To provide the second input to the subtractor comparator 62 representing the actual number of input signal excursions occuring during a sample time, the input signal line 50 is connected to the clock of n-stage counter 64 which is physically identical to the n-stage counter 54. The sample time generator 56 is connected to the reset input of counter 64 such that the number of signal excursions counted by counter 64 is dumped at the end of each sample time in parallel into the subtractor comparator 62. The difference signal from the subtractor comparator 62 is a single bit output to the output latch 68. A clock input of latch 68 receives the sample rate signal on line 66 so as to produce an output on line 70 representing in AM binary form the demodulated content of the input signal on line 50. A clock signal is available on line 72 for use with the data output signal in subsequent circuitry such as a binary multiple bit decoder for a radio controlled security system.

A specific numerical example is useful in understanding the operation of the device of FIG. 4. In this example, the input signal $f_n$ consists of a first component, f0 equal to 1.0 megahertz and a second component, f1 equal to 1.1 megahertz keyed at a 1 kilohertz rate and using a 50% duty cycle for each frequency. The sample rate produced by generator 56 is 2 kilohertz. m=10 an n is any number not less than 10. The sample period is 500 microseconds and the averaging period is 512 milliseconds. Using these numbers, the total number of signal frequency excursions during the averaging period is 537,600 and the average count during a sample time of 500 microseconds is 525.

The data count can range from (f0) 1 megahertz×500 microseconds=500 to (f1) 1.1 megahertz×500 microseconds=550. If the sample time produces a count of 500 the output of the latch 68 is a binary "0" and if the sample count is 550, the output of the latch 68 is a binary "1".

Figure 5:
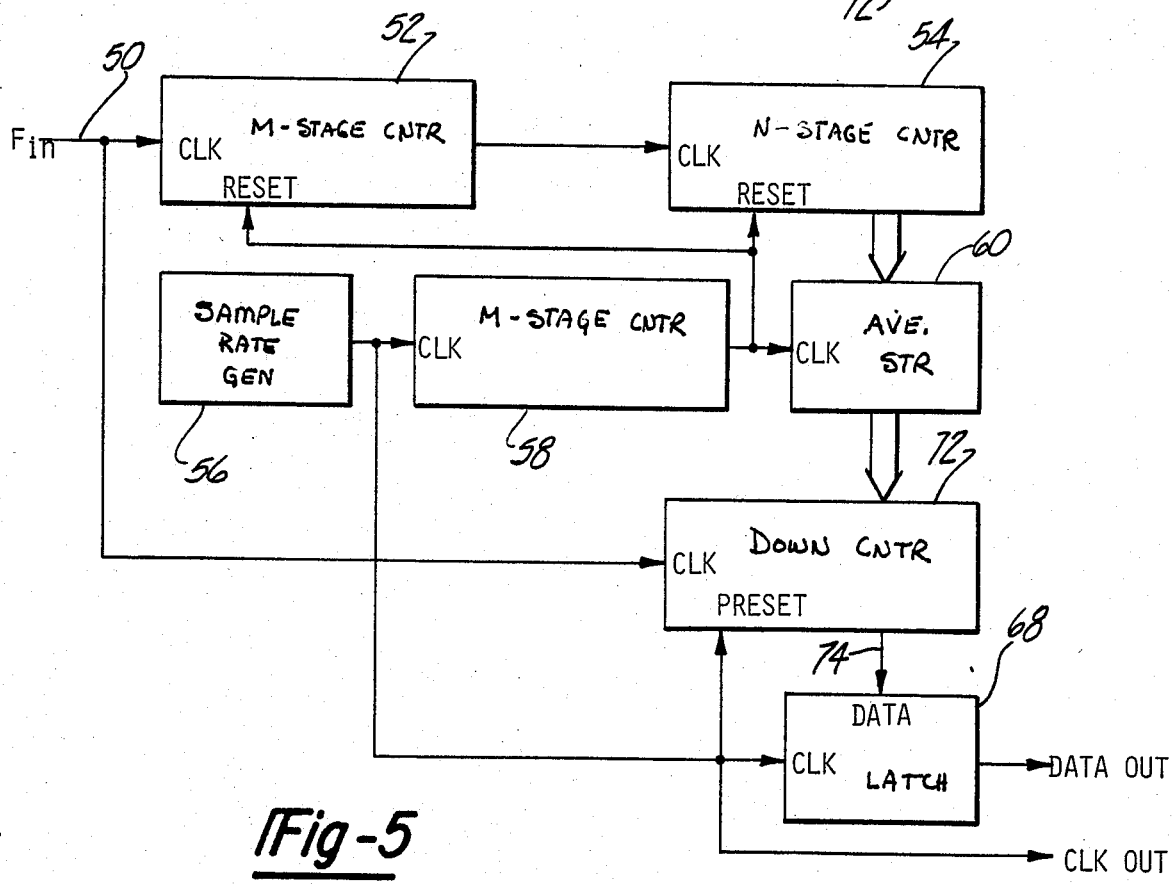
FIG. 5 is a still further embodiment of the invention using a down counter for count comparison purposes.

Looking now to FIG. 5, a third embodiment of the invention also using pulsed count averaging is disclosed. Input signal line 50 and devices 52, 54, 56, 58, 60 and 68 are numbered to correspond to the identical devices in the circuit of FIG. 4. The difference between FIG. 5 and FIG. 4 lies primarily in the use of the n-stage digital down counter 72 which is connected to received in parallel the number N from the average store 60 as well as the input signal $F_{in}$ from line 50, the latter being connected to the clock or "down count" input of the down counter 72. The reset input of the down counter 72 is connected to receive the output of the sample rate generator 56 so that the contents of counter 72 are reset to the average number N at the end of each sample time.

In operation, the circuit of FIG. 5 operates identically to the circuit of FIG. 4 as far as device 52, 54, 56, 58, 60 and 68 are concerned. By way of difference, the average number N is periodically set or preset into the down counter 72 at the beginning of a sample time. During the sample time the excursions of the input signal $F_{in}$ applied to the clock input cause the counter 72 to count down. If the number of signal excursions during the sample time is less than the average number N which is set into the counter, no overflow at line 74 occurs and the output latch 68 produces a binary "0". This corresponds to the receipt of an f0 component during the sample time. If, on the other hand, the number of input signal excursions exceeds the average number N in the down counter 72, an overflow occurs on line 74 which causes the output latch 68 to produce a binary "1". This corresponds to the receipt of an f1 data component during the sample time.

It is to be understood that the invention is not limited to any particular frequency range or to any particular application although application to security systems, gate and door operators and the like is particularly advantageous in that the size and operating characteristics of the transmitters in those systems are such as to give rise to a fair amount of frequency drift and noise at the embodiments of the subject invention which use count averaging are particularly effective in performing the demodulation function in the presence of frequency drift and noise. The subject circuit, although shown as digital components, is susceptible of large scale integrated circuitry and, for that matter, may be advantageously integrated with other elements such as a binary signal decoder in a single custom chip.

I claim:
1. A method for demodulating an FM signal consisting of at least first and second discrete frequency components f0 and f1 representing data values and for deriving an output signal containing said data comprising the steps of:
    sampling the FM signal periodically and at a rate higher than the rate of occurrence of said components;
    counting the number of excursions n of said signal during each sample time;
    comparing the sample counts n to a number N which is higher than the maximum number of f0 excursions which occur during a sample time and which is lower than the maximum number of f1 excursions which occur during a sample time; and
    generating an output having a first characteristic when n is less than N and a second characteristic when n is greater than N.
2. The method defined in claim 1 including the further step of counting the number of actual signal excursions over a signal period comprising a plurality of sample times and dividing the count by the number of sample times in the period thereby to derive said number N.
3. The method defined in claim 1 wherein the comparing step is accomplished by decrementing a count N for each excursion of the sampled signal; and the generating step comprises the generation of a signal of one character if the decremented count reaches zero and another if the decremented count does not reach zero during a sample time.
4. An FM signal demodulator for deriving a data signal from an FM signal consisting of first and second distinct frequency components f0 and f1 comprising:
    means for sampling the FM signal periodically and at a rate higher than the rate of occurrence of said components within said FM signal;
    means for counting the number of excursions n of said signal during each sample time;
    means for comparing a sample count to a number N which is higher than the maximum number of f0 excursions which occur during a sample time and which is lower than the maximum number of f1 excursions which occur during a sample time; and
    means for generating an output having a first characteristic when n is less than N and a second characteristic when n is greater than N.
5. The apparatus of claim 4 further including means for counting the actual number of FM signal excursions over multiple sample times, and means for dividing the accumulated count by the number of sample times to derive a number N representing the average number of signal excursions occurring during a sample time.
6. The apparatus as defined in claim 4 wherein said means for comparing comprises a down counter containing the number N, said down counter being connected by decremented by the excursions of the sampled signal for generating an output of one characteristic if the down counter reaches zero during a sample time and another characteristic if the down counter does not reach zero during a sample time.

* * * * *